US006533237B1

(12) United States Patent
Matusek

(10) Patent No.: US 6,533,237 B1
(45) Date of Patent: Mar. 18, 2003

(54) APPARATUS AND METHOD FOR HOLDING AN ELONGATED MEMBER

(75) Inventor: Darwin D. Matusek, Houston, TX (US)

(73) Assignee: Third Arm Solutions, Inc., Houston, TX (US)

( * ) Notice: Subject to any disclaimer, the term of this patent is extended or adjusted under 35 U.S.C. 154(b) by 0 days.

(21) Appl. No.: 09/777,534

(22) Filed: Feb. 6, 2001

Related U.S. Application Data

(60) Provisional application No. 60/181,032, filed on Feb. 8, 2000.

(51) Int. Cl.[7] .............................................. F16M 13/00
(52) U.S. Cl. ..................... 248/514; 248/291.1; 248/538
(58) Field of Search ................... 248/515, 538, 248/514, 291.1, 284.1, 528; 135/16, 20.1

(56) References Cited

U.S. PATENT DOCUMENTS

| 278,973 | A | | 6/1883 | Kizer | |
|---|---|---|---|---|---|
| 970,751 | A | * | 9/1910 | Pranke | ........................ 135/16 |
| 1,013,734 | A | * | 1/1912 | Boyd | .......................... 211/35 |
| 2,605,778 | A | * | 8/1952 | Clapper | ..................... 135/20.1 |
| 2,759,486 | A | * | 8/1956 | Pesaturo | |
| 3,304,035 | A | | 2/1967 | Davis | |
| 3,304,036 | A | | 2/1967 | Davis | |
| 3,602,466 | A | | 8/1971 | Drowns | |
| 3,724,791 | A | * | 4/1973 | Mason | ........................ 248/514 |
| 4,720,074 | A | | 1/1988 | Gard et al. | |
| 4,765,584 | A | * | 8/1988 | Lazaris | ....................... 211/70.1 |
| 5,054,737 | A | * | 10/1991 | Delancey | ..................... 248/515 |
| 5,320,322 | A | * | 6/1994 | Williams | ..................... 116/173 |
| 5,396,915 | A | * | 3/1995 | Bomar | ........................... 135/16 |
| 5,588,630 | A | * | 12/1996 | Chen-Chao | .................. 248/514 |
| 5,636,649 | A | * | 6/1997 | Horvath | ...................... 135/15.1 |
| 5,727,583 | A | * | 3/1998 | Kennedy | .................... 135/15.1 |
| 6,007,042 | A | * | 12/1999 | Baynard et al. | ............. 248/515 |

OTHER PUBLICATIONS

Advertisement From Internet Website Adress www.parfoundist.com for Golf Umbrella Holder UH–01 (1 Page).
AdvertisementFfrom Internet Website Adress www.asian-golf-guide.com for Golf Cart Umbrella Holder GA–06, GA–07 (1 Page).
Photographs (3 Photos) of Device Made by Inventor Darwin D. Matusek of Present Application and Used in Public Over 1 Year Prior to Effective Filing Date of Present Application (1 Page).

* cited by examiner

Primary Examiner—Korie Chan
(74) Attorney, Agent, or Firm—E. Randall Smith

(57) ABSTRACT

An apparatus connectable to a supporting structure and capable of holding an elongated member at any among a plurality of differing angular orientations relative to the supporting structure includes a base associated with the supporting structure and a body including a carrier capable of holding the elongated member. A first releasable connector may be associated with the carrier and engageable with the elongated member, preventing removal of the elongated member from the apparatus. The body is engageable at one end with the base and pivotably movable between a plurality of angular positions relative to the base. The body may include two portions that are releasably connectable in any among a plurality of different relative positions, allowing the distance between the carrier and the base to be adjustable.

32 Claims, 3 Drawing Sheets

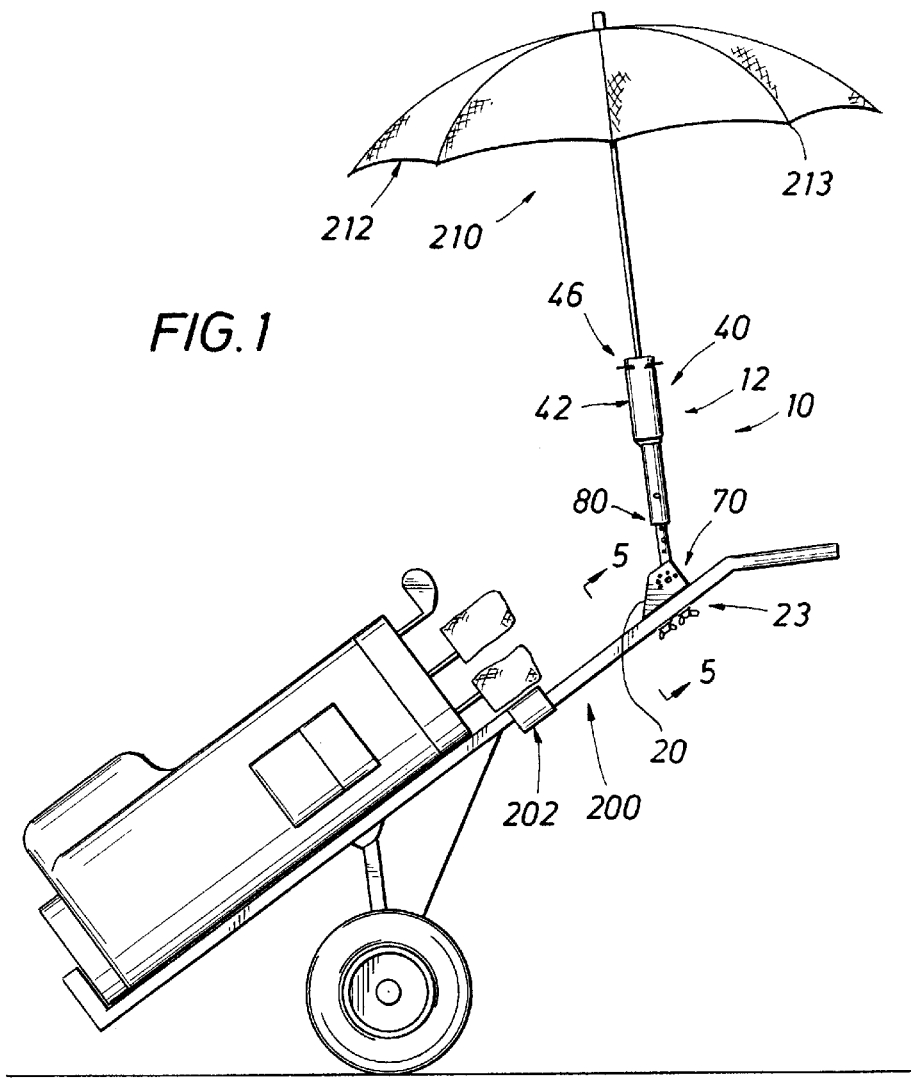
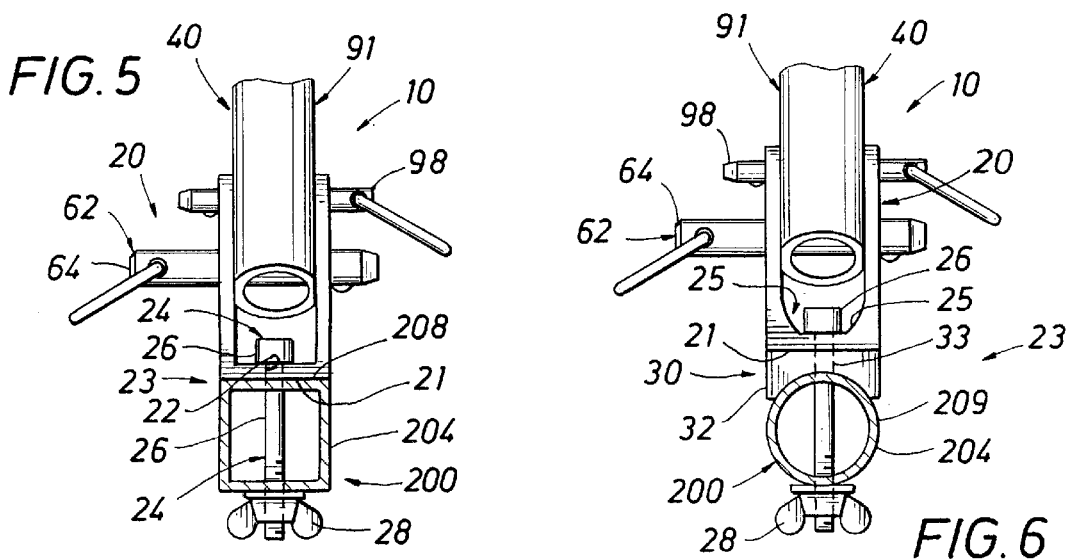

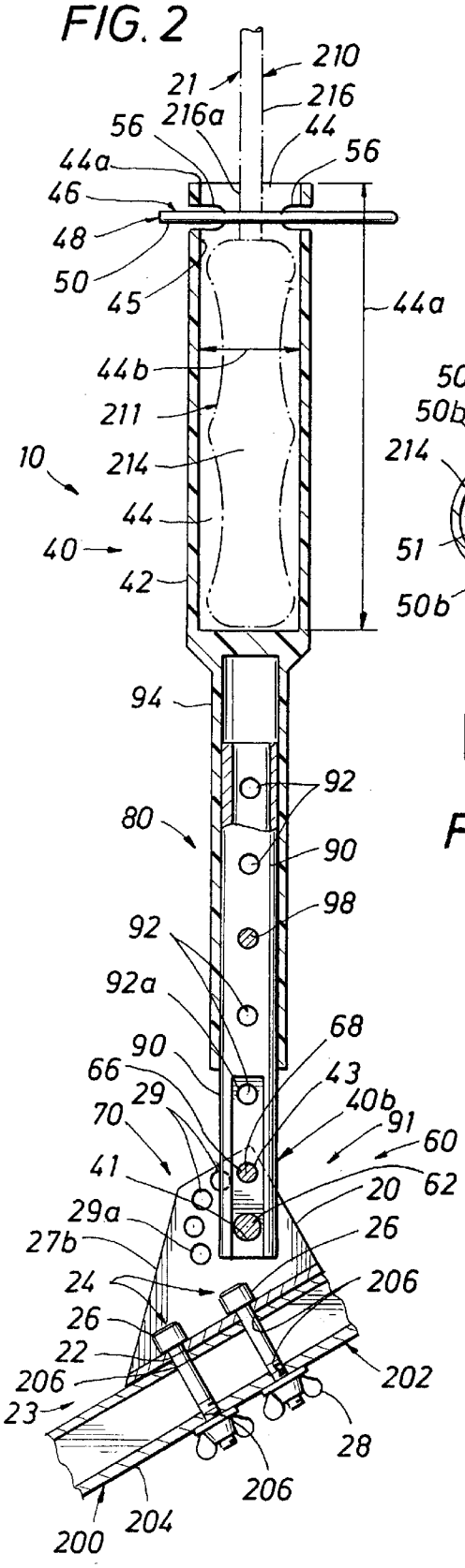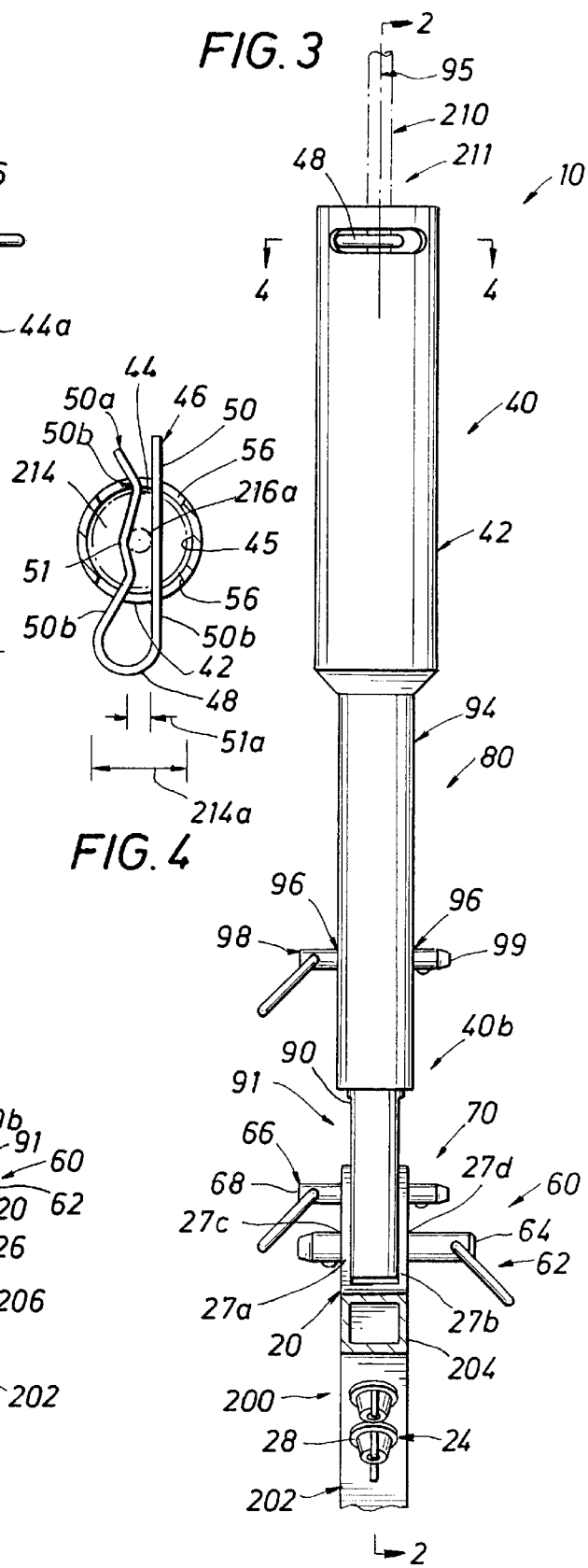

APPARATUS AND METHOD FOR HOLDING AN ELONGATED MEMBER

CROSS REFERENCE TO RELATED APPLICATIONS

The present application claims the benefit of U.S. Provisional Application Ser. No. 60/181,032, filed Feb. 8, 2000, entitled Apparatus and Method for Holding an Elongated Member, which is incorporated herein by reference in its entirety.

STATEMENT REGARDING FEDERALLY SPONSORED RESEARCH AND DEVELOPMENT

Not applicable.

BACKGROUND OF THE INVENTION

The present invention relates generally to the field of apparatus and methods for holding elongated members. More particularly, the present invention relates to apparatus connectable to a supporting structure for releasably holding elongated members at any among a variety of positions, and related methods.

Various activities involve the use of some sort of an item that is elongated, or has an elongated portion, which is desired to be held in position ranging from upright to horizontal and which may be associated, or used, with a supporting structure of some sort. It is often desirable or may be beneficial not to have to manually hold such elongated members and to be able to change the position of the elongated members.

An example of an elongated member is a fishing rod, or pole. It may be desirable, for example, to have one or more fishing rods held in position during at least part of the time while fishing without having to manually hold the rod(s). Other examples of elongated members, without limitation, include antennas, construction related equipment and support poles, such as the poles used to hold an overhead canopy erected over a truck bed, open area(s) of a boat or other areas. In all such cases, it may be desirable to have the respective elongated member held in position without having to manually hold the item, and also to be able to change the position of the elongated member.

Another type of elongated member is an umbrella. Umbrellas, for example, are often used by golfers while playing golf, such as to provide shade from sunshine and overhead cover from rain. It may thus be desirable for golfers to use an umbrella, but without having to hand-carry it. Further, it may, at times, be desirable or necessary to adjust or vary the position of the umbrella to ensure it provides the desired cover.

Various umbrella holders have been previously suggested. In 1883, an umbrella support was suggested in U.S. Pat. No. 278,973 to Kizer. Upon review today, the disclosed apparatus has many limitations and disadvantages. For example, the umbrella support is limited to attachment to the seat of a vehicle or agricultural equipment with the use of a U-shaped clamp. In the 1960's, inventor C.R. Davis was issued U.S. Pat. Nos. 3,304,035 and 3,304,036 for golf cart umbrella attachments. Upon review, each of these patents also appears to have numerous limitations and disadvantages. For example, both devices are complex in construction and require many interconnected parts. For another example, both are limited to connection around a tube-shaped member.

Other golf cart umbrella support devices were proposed in U.S. Pat. Nos. 3,602,466 and 4,720,074, both such disclosures also having numerous limitations and disadvantages. For example, each disclosure is limited to being attached to the open end of a tubular part of a golf bag pull-cart. For another example, the '074 patent is limited to use with only umbrellas having a bulb-type handle. More recently, John Bomar of Troup, Texas disclosed a shading apparatus for attachment to a riding lawnmower in U.S. Pat. No. 5,396, 915 issued on Mar. 14, 1995. This disclosure also has many limitations and disadvantages. For example, the disclosed device must be attached to a vertical surface of a riding lawnmower, such as the seat. For another example, the Bomar device requires a unique umbrella having a shaft that fits or matches a U-shaped clamp.

With respect to each of the above-cited patents, it is important to understand that there are numerous other disadvantages and limitations in addition to the particular disadvantages mentioned above. The additional disadvantages and limitations can be readily understood from a thorough review of each respective patent. The above-cited disadvantages are thus merely examples, and should in no way limit or affect the scope of any of the appended claims because of their mention herein. Further, none of the appended claims necessarily excludes any of the aforementioned exemplary disadvantages. (Any comparison of any of the above-cited patents with the invention of any of the appended claims should include all of the numerous disadvantages and features of the prior patent considered together, or in combination, and compared to the entirety of the selected claim(s).)

Thus, there remains a need for apparatus and methods having one or more of the following capabilities: being effective and efficient at holding elongated members at a variety of different positions or angular orientations; the apparatus being simple, durable, having minimal parts, being cost effective to manufacture, easy to use or any combination thereof; the apparatus being useful in different applications, to hold different types of elongated member to be connected to different types of supporting structures or any combination thereof; and the apparatus being minimally bulky when attached to a supporting structure and/or easy to store during non-use.

BRIEF SUMMARY OF THE INVENTION

In accordance with certain embodiments of the present invention, there is provided an apparatus connectable to a supporting structure and capable of holding an elongated member at any among a plurality of differing angular orientations relative to the supporting structure. The apparatus includes a base associated with the supporting structure and a body having first and second portions. The first portion of the body has first and second ends, the first end being engageable with the base and pivotably movable between a plurality of angular positions relative to the base. The second portion of the body includes a carrier capable of releasably engaging the first end of the elongated member. A first releasable connector is associated with the carrier, engageable with the elongated member and capable of securing the elongated member to the carrier, preventing removal of the elongated member from the apparatus. The first and second portions of the body are releasably connectable to one another .in any among a plurality of different relative axial positions, whereby the distance between the carrier and base is adjustable.

A second releasable connector engageable between the base and the first portion of the body may be included, the second releasable connector including a pin engageable with any among a plurality of holes disposed in the base. In such case, the first portion is movable among the plurality of angular positions of the first portion relative to the base by moving the pin among the plurality of holes disposed in the base. The first portion of the body may be pivotably movable between at least four different positions relative to the base, whereby the body may be disposed in at least four different angular positions relative to the supporting structure. When the first portion of the body is disposed in at least one position, the body may be disposed substantially adjacent to the supporting structure.

A third releasable connector may be included that is engageable between the first and second portions of the body, which may be telescopically engageable, the first and second portions being disconnectable by removing the third releasable connector. A fourth releasable connector engageable between the base and the supporting structure and including at least one bolt extending through the base and an outer surface of the supporting structure may be included.

The elongated member may include an end portion disposed at its first end and a shaft extending from the end portion. The carrier may include a cavity having a width and an upper opening and be capable of enclosing the end portion of the elongated member and a section of the shaft adjacent to the end portion. Further, the first releasable connector may be disposable across the width of the cavity and engageable with the shaft of the elongated member. The end portion of the elongated member is disposed in the cavity and moved in the direction of the upper opening-of the cavity, the first releasable connector prevents movement of the end portion out of the cavity, preventing the elongated member from being removed from the apparatus. The elongated member may be an umbrella, and the first releasable connector capable of preventing removal of the umbrella from the carrier during non-severe wind. The first releasable connector may be a hitch pin.

Certain embodiments of the present invention involve an apparatus connectable to a supporting structure and capable of holding an umbrella at any among a plurality of differing angular positions relative to the supporting structure. The apparatus includes a base rigidly engageable with the supporting structure and a body having first and second arms. The first arm of the body has first and second ends, the first end of the first arm being movably engageable with the base, rendering the body movable between a plurality of different angular positions relative to the supporting structure. At least one such angular position of the body disposes the body substantially adjacent to the supporting structure. The second arm includes a carrier capable of releasably carrying the first end of the umbrella. A first releasable connector associated with the carrier and engageable with the umbrella is included, the first releasable connector being capable of preventing removal of the umbrella from the carrier during use. The first and second arms are interconnectable in any among a plurality of different positions relative to one another, whereby the distance between the carrier and the base may be changed.

The first and second arms of the body may be slidably engageable. A second releasable connector engageable between the first and second arms may be included, whereby the first and second arms may be disconnected by disengaging the second releasable connector from at least one of the first and second arms. The first end of the first arm may be releasably engageable with the base. A third releasable connector engageable between the first end of the first arm and the base may be included, enabling disconnection of the body from the base by disengaging the third releasable connector from at least one of the first arm and base. The first releasable connector may be a hitch pin, and the third releasable connector may be a cotterless hitch pin.

A fourth releasable connector engageable between the base and the first end of the first arm may be included and have a pin engageable with any among a plurality of holes disposed in the base. The body is, in such instances, movable among its plurality of angular positions relative to the base by moving the pin among the plurality of holes disposed in the base. A fifth releasable connector may be engageable between the base and the supporting structure, the fifth releasable connector including at least one bolt extending through the base and an outer surface of the supporting structure. The supporting structure may be an electric golf cart.

The umbrella may include a handle, canopy and shaft extending between the handle and canopy, and the carrier may include a cavity having an upper opening and being capable of enclosing the umbrella handle and a section of the umbrella shaft adjacent to the handle. The first releasable connector may be engageable with the shaft of the umbrella. Thus, when an umbrella handle in the cavity is moved through the cavity toward the upper opening of the cavity, the first releasable connector prevents removal of the umbrella handle out of the cavity, preventing the umbrella from being disengaged from the apparatus. The carrier may include first and second openings on opposing sides of the cavity, and the first releasable connector may be extendable into the first and second openings and across the width of the cavity. When the umbrella handle is moved through the cavity toward the upper opening of the cavity, the umbrella handle abuts the first releasable connector within the cavity.

The invention may take the form of an apparatus connectable to a golf cart and capable of holding an umbrella at any among a plurality of differing angles relative to the golf cart. The apparatus includes a base associated with the golf cart, a body having first and second arms. The first arm of the body is movably engageable with the base and movable between at least two angular positions relative to the base, at least one such angular position disposing the first arm at least substantially adjacent to the golf cart. The second arm of the body is capable of releasably holding a first end of the umbrella. A first releasable connector is associated with the second arm and releasably engageable with the umbrella, the first releasable connector being capable of preventing removal of the umbrella from the second arm. The first and second arms are releasably connectable in any among a plurality of relative positions, whereby the distance between an umbrella held by the second arm and the base may be varied.

A second releasable connector may be included that is engageable between the base and the first end of the first arm, the second releasable connector including a pin engageable with any among a plurality of holes disposed in the base. In such instances, the first arm is movable among the angular positions relative to the base by moving the pin among the plurality of holes disposed in the base. The first arm may be releasably engageable with the base. A third releasable connector may be included that is engageable between the first arm and the base, wherein the body may be disconnected from the base by disengaging the third releasable connector from at least one of the first arm and the base.

The first and second arms of the body may be telescopically engageable, and a fourth releasable connector may be included that is engageable between the first and second arms. The first and second arms in this configuration may be disconnected by disengaging the fourth releasable connector from at least one of the first and second arms. A fifth releasable connector engageable between the base and the golf cart may be included, the fifth releasable connector including at least one bolt extending through the base and an outer surface of the golf cart.

The umbrella may include a handle, a canopy and a shaft extending between the handle and the canopy. The second arm may include a cavity having a width and an upper opening and be capable of enclosing the umbrella handle and a section of the umbrella shaft adjacent to the umbrella handle. The first releasable connector may be disposable across the width of the cavity and engageable with the umbrella shaft, whereby when the umbrella handle is moved in the cavity in the direction of the upper opening, the umbrella handle abuts the first releasable connector within the cavity, preventing the umbrella handle from being removed from the cavity. The golf cart may be a golf bag pull-cart.

In certain embodiments of the invention, an apparatus useful with an umbrella holder prevents an umbrella being carried thereby from being removed therefrom. The umbrella includes a handle, a canopy and a shaft extending between the handle and the canopy. The apparatus includes an umbrella carrier having a cavity. The cavity has a width and an upper opening and is capable of generally enclosing the umbrella handle and a section of the umbrella shaft adjacent to the umbrella handle. The apparatus includes a releasable connector associated with the carrier and disposable across the width of the cavity, the releasable connector being capable of at least partially surrounding the shaft of the umbrella. When the umbrella is moved out of the cavity through the upper opening of the cavity, the releasable connector engages the umbrella handle within the cavity, preventing the umbrella from being removed from the umbrella holder.

The umbrella carrier may include first and second openings on opposing sides of the cavity, and the releasable connector may be removably extendable into such openings and across the width of the cavity. The releasable connector may be a hitch pin. The umbrella handle may have a width, and the releasable connector may have first and second fingers disposed on opposing sides of the umbrella shaft when the releasable connector at least partially surrounds the umbrella shaft. The distance between the first and second fingers of the releasable connector is smaller than the width of the umbrella handle.

Certain embodiments of the invention involve an apparatus useful with an elongated member holder and connectable to a supporting structure for bracing the elongated member holder and providing a plurality of angular positions of the elongated member holder relative to the supporting structure. The apparatus includes a base associated with the supporting structure, the base having first and second opposing walls. An arm associated with the elongated member holder is also included, the arm having first and second ends and a length extending therebetween. A first connector is engageable between the first end of the arm and the first and second opposing walls of the base, whereby the arm is pivotably movable relative to the base. The first and second opposing walls of the base are disposed adjacent to the arm on opposing sides of the arm, and extend at least partially along the length of the arm proximate to the first end of the arm when the arm and the base are connected. The arm is releasably, rigidly engageable with the first and second opposing walls of the base in any among a plurality of positions, whereby the elongated member holder is pivotably movable between a plurality of angular positions relative to the supporting structure.

Each of the first and second opposing walls of the base may include a plurality of adjacent holes disposed around the first connector, each such adjacent hole of the first opposing wall being aligned with one of the plurality of adjacent holes of the second opposing wall. A second connector engageable between the arm and each such aligned pair of adjacent holes may be included. The base may include a passageway alignable with any aligned pair of adjacent holes. The second connector may be a releasable pin. The elongated member may be an umbrella and the supporting structure may be a golf cart.

In certain embodiments of the present invention, an apparatus connectable to a supporting structure and capable of holding an umbrella at any among a plurality of differing angular positions relative to the supporting structure includes a base and means for rigidly connecting the base with the supporting structure. A body having first and second arms and means for pivotably connecting the first arm with the base is included, whereby the body is movable between a plurality of different angular positions relative to the supporting structure. The second arm includes a carrier capable of releasably carrying the first end of the umbrella. The apparatus also includes means for locking the umbrella to the carrier and means for adjustably connecting the first and second arms in any among a plurality of different axial positions relative to one another.

An embodiment of a method for holding an elongated member at any among a plurality of positions relative to a supporting structure with the use of an apparatus having a base and first and second arms, the second arm having a carrier capable of holding an end of the elongated member includes pivotably moving the first arm relative to the base into any among a plurality of angular positions relative to the base. The angular position of the body relative to the base is securable by engaging a releasable connector between the first arm and the base. The first end of the elongated member in disposable in the carrier, a releasable connector being engageable between the carrier and the elongated member and preventing removal of the elongated member from the carrier at least under typical operating conditions. The second arm is movable relative to the first arm of the body to the desired height of the elongated member relative to the base, and the position of the second arm is securable relative to the first arm by engaging a connector between the first and second arms. The base may be positionable relative and rigidly connected to the supporting structure.

Accordingly, the present invention comprises features and advantages which enable it to substantially advance the technology associated with elongated member holders. Characteristics and advantages of the present invention described above, as well as additional features and benefits, will be readily apparent to those skilled in the art upon consideration of the following detailed description and referring to the accompanying drawings.

BRIEF DESCRIPTION OF THE DRAWINGS

For a detailed description of preferred embodiments of the invention, reference will now be made to the accompanying drawings wherein:

FIG. 1 is a side view of one embodiment of an elongated member holder in accordance with the present invention shown holding an umbrella and attached to a golf bag pull-cart.

FIG. 2 is a cross-sectional view of the elongated member holder of FIG. 3 holder taken along lines 2—2.

FIG. 3 is a front view of the elongated member holder shown in FIG. 1.

FIG. 4 is a partial top view of the elongated member holder of FIG. 3 taken along lines 4—4.

FIG. 5 is a partial isolated view of the elongated member holder of FIG. 1 taken along lines 5—5.

FIG. 6 is a partial isolated view of another embodiment of an elongated member holder in accordance with the present invention shown attached to a supporting structure having a curved outer surface.

DETAILED DESCRIPTION OF PREFERRED EMBODIMENTS

Figure 7:
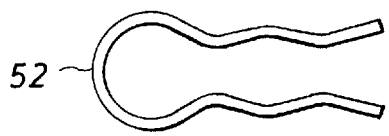
FIG. 7 is an isolated view of an embodiment of a connector pin.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout the various portions of this patent specification, the terms "invention", "present invention" and variations thereof are not intended to mean the claimed invention of any particular of the appended claim or claims, or all of the appended claims. These terms are used to refer generally to subject matter of this specification. The object or topic of any particular such reference is not necessarily part of or required by any particular claim(s) merely because of such reference. Thus, the use herein of the terms "invention", "present invention" and variations thereof is not intended, and should not be used, to limit the construction or scope of any of the appended claims.

The following detailed description of preferred embodiments, as well as the contents of the appended "Abstract", "Brief Description of the Drawings", "Brief Summary of the Invention", "Background of the Invention" sections and the accompanying FIGS. 1–13 are not intended and should not be deemed to limit the scope or construction of any of the appended claims or claim language, except and only to the extent as may be expressly provided in one or more particular claims, or as may be provided elsewhere is this detailed description section in the form of definitions provide for specific terms which may appear in one or more of the appended claims.

Referring initially to FIG. 1, an exemplary elongated member holder 10 connectable with a supporting structure 200 and capable of carrying an elongated member 210 is shown. The illustrated example of the elongated member holder 10 in FIG. 1 is an umbrella holder 12. The supporting structure 200 to which the depicted umbrella holder 12 is attached is a golf bag pullcart 202, and the elongated member 210 shown being held by the umbrella holder 12 is an umbrella 212. As used throughout all of the various sections of this patent specification and the appended claims (collectively, the "present specification"), the term "elongated" and variations thereof means having a width that is small is proportion to its height or length. An "elongated member" or "elongated item", as those terms and variations thereof are used in the present specification, includes any object that is elongated or has at least one elongated portion, and which can be held, or engaged, and sufficiently supported at one end. Otherwise, the present invention is not limited to the structure, type, form or configuration of elongated members with which the present invention can be used, except and only to the extent as may be expressly provided in one or more particular claims. A few example of items that may be elongated members are fishing rods, umbrellas, antennas, construction related equipment and support poles, such as the support poles used to hold an overhead canopy erected over a truck bed, open areas of a boat or other areas.

Also as used throughout the present specification, the term "supporting structure" and variations thereof means any object, apparatus or part thereof to which an elongated member holder of the present invention may be connected, mounted or engaged, and which is capable of sufficiently supporting such elongated member holder and the item(s) being held thereby under normal or acceptable operating conditions. Otherwise, the present invention is not limited to the structure, type, form or configuration of supporting structures with which the present invention can be used, except and only to the extent as may be expressly provided in one or more particular claims. Examples of supporting structures with which the present invention may be designed to be used include, without limitation, chairs, baby carriages, vehicles, electric golf carts, golf bag pull-carts, golf bags, floating vessels, boats, trucks, riding and other mowers, bulldozers, backhoes, reapers, ditch-witches, plows, other construction, maintenance, mechanized or motorized equipment, work-related equipment, such as work benches, trailers and other types of equipment. The elongated member holder 10 of the present invention is thus not limited to an umbrella holder, such as umbrella holder 12 connectable with a golf pull-cart, such as cart 202, but includes apparatus of any suitable structure, type, form and configuration capable of holding an elongated member and being adequately connectable to an supporting structure. The elongated member holders shown in FIGS. 1–13 and described herein are thus merely illustrative of embodiments the present invention and are not limiting upon the accompanying claims unless and only to the extent as may be expressly provided in particular claims.

Still referring to FIG. 1, the elongated member holder 10 includes a base 20 and a body 40. The base 20 is connectable to the supporting structure 200 and the body 40 is engageable with the elongated member 210. The base 20 and body 40 can take any suitable structure, form, configuration and construction, and the present invention is not limited to the embodiments of the base 20 and body 40 shown in FIGS. 1–13 and described herein.

The exemplary base 20 is shown connected to the supporting structure 200 with the use of a support attachment mechanism 23. In the illustrated examples of FIGS. 2 and 5, the base 20 is rigidly, releasably, connected to a handle extension 204 of the pull-cart 202. As used throughout the present specification, the term "rigidly" when used with terms such as "connected", "secured", "associated" and "engaged", similar terms and variations thereof means that the items being described, when connected, are movable relative to one another at the point or area of their connection under normal or expected circumstances and operating conditions within a range of and including absolutely no relative movement to minimal or acceptable amounts of relative movement.

Still referring to FIGS. 2 and 5, the depicted exemplary support attachment mechanism 23 includes releasable connector(s) 24, such as commercially available bolts 26, extendable through connection ports 22 in the base 20 and corresponding connection ports 206 in the supporting structure 200. The illustrated bolts 26 are shown secured with commercially available corresponding wing nuts 28. The base 20 has a flat bottom surface 21 that is shown abutting the flat outer surface 208 of the handle extension 204, allowing the elongated member holder 10 to be rigidly secured to the supporting structure 200. Removal of connector(s) 24 allows the base 20 and thus the elongated member holder 10 to be disconnected from the supporting structure 200.

In another embodiment, referring to FIG. 6, the supporting structure 200, such as handle extension 204, is shown having a curved outer surface 209. An adapter 30, such as intermediate member 32 having holes 33, is shown disposed between the base 20 and handle extension 204. In this instance, the flat bottom surface 21 of the base 20 is rigidly, releasably secured to the intermediate member 32, which, in turn, is rigidly, releasably connected to the handle extension 204. In other embodiments, the base 20 can instead be formed with a curved or different shaped bottom surface (not shown) to match the corresponding surface of the supporting structure, enabling rigid connection of the base 20 to the supporting structure 200 without the use of an adapter 30.

In still further embodiments, the support attachment mechanism 23 includes one or more gripping or clamping mechanisms (not shown), as are or become known in the art. In any case, the support attachment mechanism 23 may or may not be releasable, as is desired. For example, the base 20 can be welded to the supporting structure 200, the support attachment mechanism 23 being the weld. In yet other instances, there may be no support attachment mechanism 23, such as, for example, when the base 20 is molded or integrally formed with the supporting structure 200 (see e.g., FIGS. 12 and 13). Thus, the support attachment mechanism 23 need not take the above configuration(s) and, if included, can take any suitable structure, form, configuration and construction, so long as the elongated member holder 10 is connected or connectable to the supporting structure 200.

Referring again to FIG. 1, the body 40 includes an elongated member carrier 42 capable of sufficiently holding, carrying or releasably engaging the elongated member 210. In the embodiment shown, the umbrella 212 may be sufficiently held by the carrier 42, for example, when it is maintained in generally or substantially linear or axial alignment with at least part of the body 40 of the holder 10 with an acceptable amount of, or no, relative movement between the umbrella 212 and the holder 10 under normal or expected operating conditions.

In the embodiment of FIG. 2, the carrier 42 includes a cavity 44 capable of sufficiently holding, or carrying, an end 211 of the elongated member 210. The cavity 44 of this particular configuration is shown formed of a generally tubular shape. Further, the illustrated cavity 44 has a depth 44a and an inner width or diameter 44b sufficient in size to enclose, or contain, the entire umbrella handle 214 and a portion, or section, 216a of the umbrella stem 216 adjacent to the handle 214. For example, the cavity 44 of FIG. 2 can have a depth 44a of between approximately 6½ inches—approximately 8½ inches, and an inner diameter 44b of between approximately 1 inch—approximately 2 inches. In a more precise preferred embodiment, the cavity 44 can have a depth 44a of approximately 7 inches and an inner width 44b of about 1⅝ inches. Examples of presently commercially available umbrellas 212 that can be used with the exemplary umbrella holder 12 include the Totes "Sports Umbrella" Style No. 00375K and the Golf Digest "Windproof Umbrella" Model No. 8279.

It should be understood that the carrier 42 can take any suitable form, configuration, shape and construction, so long as the elongated member 210 can be sufficiently held by the elongated member holder 10. The carrier 42 thus need not possess the above structure, components and configuration. Further, a cavity 44 need not be included. When included, the cavity 44 is not limited to the dimensions, shape and/or construction described above. For example, the holder 10 may be designed with a cavity 44 that does not have a uniform width, or diameter, 44b, or which does not enclose the entire umbrella handle 214 and a portion 216a of the umbrella stem 216. Thus, when included, the cavity 44 may take any suitable configuration, dimensions, shape and construction.

Referring still to the embodiment of FIG. 2, a releasable connector, or retaining mechanism, 46 is shown associated with the elongated member holder 10 to assist in sufficiently holding, centralizing, or stabilizing the elongated member 210. Referring now to FIGS. 2 and 4, the exemplary retaining mechanism 46 includes a pin 48, such as commercially available hitch pin 50, which is capable of assisting in centralizing the umbrella 212. The exemplary pin 50 (FIG. 4) includes fingers 50b forming an open end 50a and a central portion 51, and is extendable through opposing cutaways 56 in the carrier 42 (cavity wall 45) and across the cavity 44. As the pin 50 is moved into position across the cavity 44, the umbrella stem portion 216a passes through the open end 50a of the pin 50 and is surrounded or engaged by the central portion 51. The pin 48 thus can be used to assist in stabilizing, centralizing or holding the umbrella 212 in position.

Further referring to FIGS. 2 and 4, the releasable connector, or retaining mechanism, 46 may be designed to prevent the elongated member 210 from being drawn out of, or removed from, the elongated member holder 10. In the embodiment shown, the distance 51a between the fingers 50b at the central portion 51 of the pin 50 is smaller than the width, or diameter, 214a of the umbrella handle 214. As the umbrella 212 disposed in the carrier 42 and engaged by the pin 50 is moved in the direction of the upper opening 44a (FIG. 2) of the cavity 44, the handle 214 will abut, contact or engage, the pin 50, which will stop any further upward movement of the handle 214. Thus, when the umbrella holder 12 is being used under generally normal or expected operating conditions, the pin 48 effectively locks the handle 214 in the cavity 44, preventing the umbrella handle 214 from moving out of the carrier 42. This capability may be desirable, for example, during use of the depicted embodiment of elongated member holder 10 with an umbrella 212 when the umbrella canopy 213 is open (FIG. 1), such as, for example, while walking on a golf course, during a breeze, wind or other relatively non-severe weather. (During severe weather, the ability of the elongated member holder to retain the elongated member is likely to be among the lesser concerns of those involved, has not been evaluated and is therefore unpredictable.)

It should be understood that the use of a releasable connector, or retaining mechanism, 46 is not essential for the present invention. Further, when desired, the releasable connector, or retaining mechanism, 46 need not take the form(s) or configurations described above, but may take any suitable structure, form, configuration and construction. For example, the releasable connector 46 need not include a pin 48, but may include a different device or mechanism capable of assisting in centralizing, stabilizing, holding and/or locking the elongated member 210 in the holder 10. If a pin 48 is used, it need not be a hitch pin 50, but can take any suitable form (e.g. commercially available pin 52 of FIG. 7).

Figure 8:
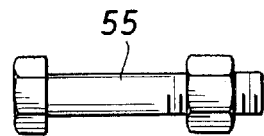
FIG. 8 is an isolated view of an embodiment of a connector.
Figure 9:
FIG. 9 is an isolated view of another embodiment of a connector pin.
Figure 10:
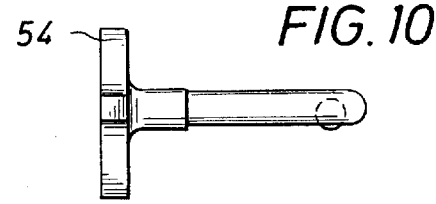
FIG. 10 is an isolated view of still another embodiment of a connector pin.

Referring now to FIGS. 2 and 3, the body 40 of the illustrated embodiment is connectable to the base 20 with a connector 60. In the configuration shown, the lower end 40b of the body 40 is insertable between side walls 27a, 27b (FIG. 3) of the base 20. The lower end 40b includes a first passage 41 (FIG. 2) that corresponds with holes 27c, 27d (FIGS. 3, 13) formed in the walls 27a, 27b respectively. The connector 60 of this embodiment includes a pin 62, such as commercially available cotterless hitch pin 64, which is insertable through the first passage 41 and holes 27c, 27d (see also FIGS. 12, 13). The body 40 is pivotable about the pin 62. The exemplary pin 62 may be removed, allowing the base 20 and body 40 to be separated, such as may be desirable during non-use or storage. However, the pin 62 need not be removable. Further, any other suitable type of pin 62 may be used, such as, without limitation, pins 53 and 54 of FIGS. 9 and 10, respectively. Moreover, the connector 60 need not include a pin 62, but can be any componentry having any suitable structure, configuration and form capable of connecting the body 40 and base 20. A few examples include a commercially available nut/bolt combination 55, such as shown in FIG. 8, or one or more mechanisms integral (not shown) with the base 20, body 40 or both.

Still referring to FIGS. 2 and 3, the present invention may, if desired, also possess the capability of varying the angular orientation of the body 40 or carrier 42 relative to the base 20, and thus the elongated member 210 relative to the supporting structure 200. In the embodiment shown, a connection mechanism 70 includes numerous corresponding pairs of adjacent passageways 29 formed in an arc-like pattern into opposing side walls 27a, 27b of the base 20 around previously described pin 62, or holes 27c, 27d (see also FIGS. 12, 13). A corresponding second passage 43 (FIG. 2) is formed in the lower end 40b of the body 40 above the first passage 41, and a releasable connector 66, such as commercially available pin 68, is extendable therethrough. It should be understood that pin 68 is not required, and any other suitable structure, configuration and form of connector 66 may be used (e.g. pins 53 or 54 of FIGS. 9 and 10 respectively; nut/bolt combination 55 of FIG. 8) that is capable of allowing the body 40 or carrier 42 to be adjustable between numerous positions relative to the base 20.

Figure 11:
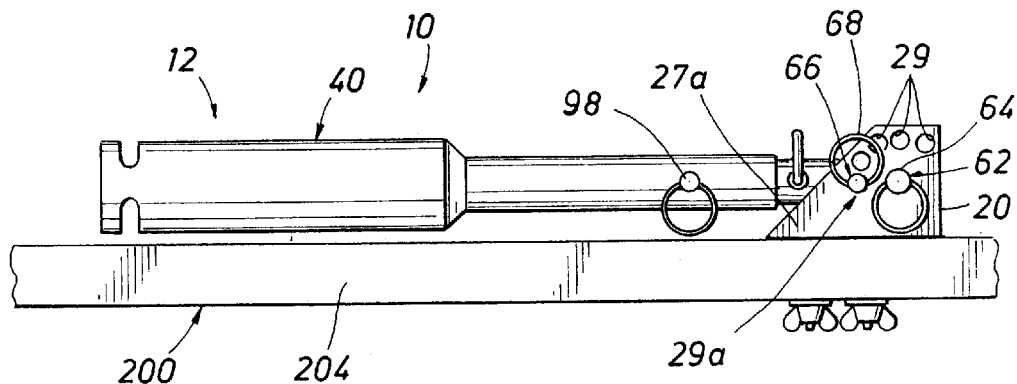
FIG. 11 is a side view of an embodiment of an elongated member holder in accordance with the present invention showing the body of the holder disposed adjacent to a supporting structure.
Figure 12:
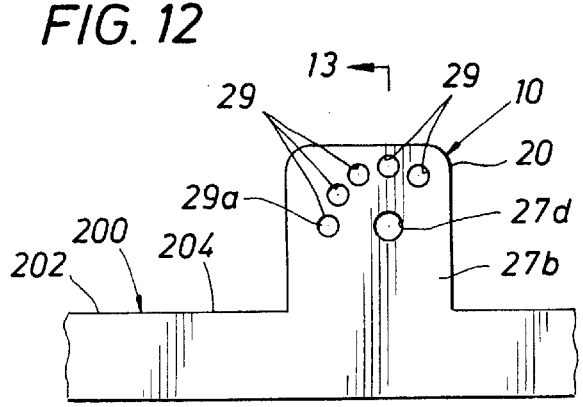
FIG. 12 is a partial side view of an embodiment of a base of an elongated member holder in accordance with the present invention, the base being integral with a supporting structure.
Figure 13:
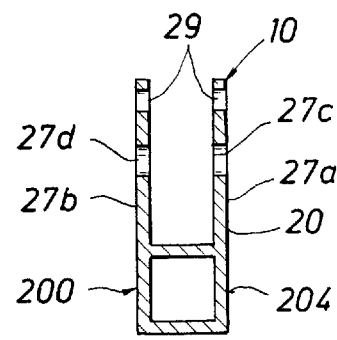
FIG. 13 is a cross-sectional view of the base of FIG. 12 taken along lines 13—13.

In the illustrated embodiment, there are five corresponding pairs of holes 29, thus allowing for a total of five different angular positions of the body 40 relative to the base 20 (and supporting structure 200). When the connector 66 is secured through the end passageways 29a (FIGS. 2, 12) of the embodiment shown, the body 40 may be secured in a "folded" position, or disposed substantially or entirely adjacent to the supporting structure 200, such as the handle extension 204 of the golf cart 202, as shown in FIG. 11. This may be desirable, for example, for storage and transport. Removal of the exemplary connector 66 and previously described pin 62 allows the exemplary body 40 to be separated from the base 20, as may also be desirable. It should be understood that the above-described configuration of the connection mechanism 70 is not required, and any other suitable structure, configuration and form that is capable of allowing the body 40 or carrier 42 to be adjustable between at least two positions relative to the base 20 may be used if such capability is desired. For example, the passageways 29 need not be in an arc-like configuration or be included in both walls 27a, 27b.

Referring now to FIG. 3, the base 20 may designed to provide support, or bracing, of the body 40 and thus the elongated member 210 being held thereby. For example, the embodiment of FIG. 3 shows the walls 27a, 27b of the base 20 abutting, or engaging, the lower end 40b of the body 40, which may assist is providing rigidity to the body 40 and preventing wobbling thereof. Any other suitable configuration may be incorporated to provide support or to brace the body 40. For example, the base 20 may include supporting ridges (not shown) or other members to assist in supporting the body 40. For another example, the base 20 of the embodiment of FIG. 6 includes supporting portions 25, which may provide additional support for the body 40 when engaged with the base 20.

Again referring to FIGS. 2 and 3, the present invention may also include the capability of adjusting or varying the distance between the carrier 42 and base 20, and thus the distance between an elongated member 210 being carried by the holder 10 and the supporting structure 200. In the embodiment shown, for example, a height adjustment mechanism 80 includes first and second portions, or arms, 90, 94 of the body 40. (The exemplary second arm 94 includes the carrier 42 previously described, and the first arm 90 is engageable with the base 20; the lower end 91 of the first arm 90 serving as the previously described lower end 40b of the body 40.) In the exemplary embodiment, both arms 90 and 94 are hollow, such as may be desirable for cost effective or ease of manufacturing, water drainage and/or minimizing weight of the holder 10.

Also in the exemplary embodiment, the first and second arms 90, 94 are slidably engageable. More particularly, the depicted first arm 90 is telescopically slidable within the second arm 94, the arms 90, 94 being generally axially aligned along a central axis 95 (FIG. 3). The second arm 94 includes a pair of corresponding aligned third passages 96 (FIG. 3) extending through its width and which are alignable with any among numerous adjacent bores 92 (FIG. 2) extending through the first arm 90 at different locations along the length of the first arm 90. A releasable connector 98, such as commercially available pin 99, is releasably engageable through any of the pairs of corresponding third passages 96 and any of the bores 92. The length of the body 40 (which includes the combined lengths of portions 90, 94), and thus the distance between an elongated member 210 carried in the holder 10 and the base 20, may be selectively adjustable.

In the example of FIG. 2, the first arm 90 includes a total of five bores 92, allowing for five different height positions of the body 40. When the connector 98 of this configuration is secured through the lowermost bore 92a (FIG. 2) and the third passages 96, the body 40 is in it shortest or most compact position, which may be desirable, such as for low overhead coverage, storage and/or transport. When the connector 98 is disengaged, the arms 90, 94 may be disconnected. It should be understood, however, that any suitable or desired number or configuration of corresponding pairs of bores 92 may be included. Further, any other suitable structure, form and configuration of a height adjustment mechanism 80 may be used. For example, the second arm 94 may instead telescope within the first arm 90, and/or the second arm 94 may possess numerous third passages 96 or corresponding sets of third passages 96. Yet further, the height adjustment mechanism 80 may include entirely different components, or not be included at all.

The various components of the elongated member holder 10 may be constructed of any suitable material(s) or material combinations that are or become known, such as materials that are strong, lightweight, waterproof, water resistant, weather resistant, durable, cost-effective or simple to manufacture, or any combination thereof, and/or have other features as may be appropriate for a particular situation or use. For example, in the preferred embodiments, the body 40 is constructed of glass-filled nylon, the base 20 constructed of anodized aluminum and the exemplary pins 50, 64, 68, 99 and bolts 26 constructed of zinc coated metal. For other examples, the body 40, base 20 and pins 50, 64, 68 and 99 may be constructed of polyethylene, plastic, glass-filled nylon, stainless steel, anodized aluminum or zinc coated metal. However, any other suitable materials could be used.

The holder 10 may, if desired, be designed to be useful with a variety of types and/or sizes of elongated members and any suitable supporting structure. The holder 10 can be designed to occupy minimal space with minimal protruding portions, to be collapsible, foldable and/or easily assembled and disassembled. The holder 10 can be constructed to be lightweight and durable and for ease of use and adjustment.

Exemplary methods for holding an elongated member at any among a plurality of positions relative to a supporting structure will now be described. Referring to the embodiment of FIGS. 1 and 2, if the base 20 is not integral with the supporting structure 200, the base 20 may be selectively positioned on the supporting structure 200 and rigidly connected thereto with the use of a support attachment mechanism 23, such as connector(s) 24. The first end 211 (FIG. 2) of the elongated member 210 may be disposed in the carrier 42, and the releasable connector 46 engaged between the carrier 42 and the elongated member 210, generally preventing removal of the elongated member 210 from the carrier 42.

Referring now to FIGS. 2 and 3, the body 40 may be pivotably moved relative to the base 20 and secured in any among a plurality of angular positions relative to the base 20 with the use of a connection mechanism 70. For example, a connector 66 may be engaged between a first arm 90 of the body 40 and the base 20. The body may have a second arm 94 that can be axially moved relative to the first arm 90 to adjust the height (or distance) of the elongated member 210 relative to the base 20 and supporting structure 200. The selected position of the second arm 94 relative to the first arm 90 may be secured with a height adjustment mechanism 80. For example, a releasable connector 98 may be engaged between the first and second arms 90, 94. Thereafter, at any time, the angle or height of the elongated member 210, or its position relative to the supporting structure 200, may be changed by repeating the pertinent acts described above.

Depending upon the design of the elongated member holder 10, the elongated member 210 may be removable from the holder 10 by disengaging the connector 46. The first and second arms 90, 94 may be separated by disengaging the height adjustment mechanism 80, and/or the body 40 and base 20 may be disconnected by disengaging connection mechanism 70 and removing the connector 60. Also depending upon the design, the first and second arms 90, 94 may be compacted by engaging the connector 98 with the first and second arms 90, 94 at the lowest bore 92a of the first arm 90, and/or the body 40 may be secured in a folded position by engaging the connector 66 through the body 40 and passageway 29a of walls 27a, 27b formed in the base 20.

It should be understood that the exemplary methods of the present invention need not include all of the acts described above, and such acts need not be performed in any particular order, such as the order above. Further, the methods of the present invention do not require use with the embodiments of the elongated member holder shown and described in the present specification, but are equally applicable with any other suitable structure, form and configuration of components. In addition, in every case, caution must be used in handling, assembling, using, adjusting and disassembling any apparatus made or used in accordance with the present invention.

It should be understood that certain features and subcombinations of the present invention are of utility and may be employed without reference to other features and subcombinations. This is contemplated and within the scope of the appended claims, except and only to the extent as may be expressly provided otherwise in particular claims. Because many possible embodiments may be made of the present invention without departing from the scope thereof, it is to be understood that all matter herein set forth or shown in the accompanying drawings is to be interpreted as illustrative and not limiting.

The apparatus and methods of the present invention offer advantages over the prior art that may not be been specifically mentioned herein but are, or will become, apparent from the description herein, the appended figures and claims. Further, while preferred embodiments of the invention have been shown and described, modifications thereof can be made by one of ordinary skill in the art without departing from the spirit or teachings of this invention and the scope of the appended claims. The embodiments described and illustrated herein are thus exemplary only and are not limiting upon the appended claims. Many variations and modifications of the apparatus and methods of the present invention are possible and within the scope of the present invention and the appended claims. Accordingly, the scope of the invention and the appended claims is not limited to the embodiments described herein.

What is claimed is:

1. An apparatus connectable to a supporting structure and capable of holding an elongated member at any among a plurality of differing angular orientations relative to the supporting structure, the elongated member having first and second ends and a shaft, the apparatus comprising:

a base associated with the supporting structure, a body having first and second portions, said first portion of said body having first and second ends, said first end of said first portion being engageable with said base and pivotably movable between a plurality of angular positions relative to said base, whereby said body is pivotably movable between a plurality of positions relative to the supporting structure, said second portion of said body having a carrier, said carrier being capable of releasably engaging the first end of the elongated member, a first releasable connector associated with said carrier and engageable with the elongated member, said first releasable connector being capable of at least partially surrounding and contacting an outer surface of the shaft of the elongated member and securing the elongated member to said carrier, and said first and second portions of said body being releasably connectable to one another in any among a plurality of relative axial positions, whereby the distance between said carrier and said base is adjustable.

2. The apparatus of claim 1 further including a second releasable connector engageable between said base and said first end of said first portion, said second releasable connector including a pin engageable with any among a plurality of holes disposed in said base, whereby said body may be secured in any among said plurality of angular positions relative to the supporting structure by moving said pin among said plurality of holes disposed in said base.

3. The apparatus of claim 2 wherein said first end of said first portion of said body is pivotably movable between at least four different positions relative to said base, whereby said body may be disposed in at least four different angular positions relative to the supporting structure.

4. The apparatus of claim 3 wherein when said first end of said first portion of said body is disposed in at least one said position of said first end relative to said base, said body is disposed substantially adjacent to the supporting structure.

5. The apparatus of claim 1 wherein said first and second portions of said body are telescopically engageable, further including a third releasable connector engageable between said first and second portions of said body, whereby said first and second portions may be disconnected by removing said third releasable connector.

6. The apparatus of claim 5 wherein the supporting structure includes an outer surface, further comprising at least a fourth releasable connector engageable between said base and the supporting structure, said fourth releasable connector including at least one bolt extending through said base and the outer surface of the supporting structure.

7. The apparatus of claim 1 wherein the elongated member include an end section disposed at the first end of the elongated member and a shaft extending from the end section, further wherein said carrier includes a cavity having a width and an upper opening and being capable of enclosing the end section of the elongated member and a portion of the shaft adjacent to the end section, wherein said first releasable connector is disposable across the width of said cavity and engageable with the shaft of the elongated member, whereby when the end section of the elongated member is disposed in said cavity and moved in the direction of said upper opening of said cavity, said first releasable connector prevents movement of the end section out of said cavity, preventing the elongated member from being removed from the apparatus.

8. The apparatus of claim 7 wherein the elongated member is an umbrella and said first releasable connector is capable of preventing removal of the umbrella from said carrier during non-severe wind.

9. The apparatus of claim 8 wherein said first releasable connector is a hitch pin.

10. An apparatus connectable to a supporting structure and capable of holding an umbrella at any among a plurality of differing angular positions relative to the supporting structure, the umbrella having first and second ends, a handle proximate to the first end, a canopy proximate to the second end and a shaft extending at least partially between the first and second ends, the apparatus comprising:

a base rigidly engageable with the supporting structure, a body having first and second arms, said first arm of said body having first and second ends, said first end of said first arm being movably engageable with said base, whereby said body is movable between a plurality of different angular positions relative to said base, at least one said angular position disposing said body substantially adjacent to the supporting structure, said second arm having a carrier, said carrier being capable of releasably carrying the first end of the umbrella, a first releasable connector associated with said carrier and engageable with the umbrella, wherein said first releasable connector is capable of at least partially surrounding and contacting an outer surface of the shaft of the umbrella, preventing removal of the umbrella handle from said carrier during use, and said first and second arms being interconnectable in any among a plurality of different positions relative to one another, whereby the distance between said carrier and said base may be changed.

11. The apparatus of claim 10 wherein said first and second arms of said body are slidably engageable, further including a second releasable connector engageable between said first and second arms, whereby said first and second arms may be disconnected by disengaging said second releasable connector from at least one of said first and second arms.

12. The apparatus of claim 11 wherein said first end of said first arm is releasably engageable with said base, further including a third releasable connector engageable between said first end of said first arm and said base, wherein said body may be disconnected from said base by disengaging said third releasable connector from at least one of said first arm and said base.

13. The apparatus of claim 10 further including a fourth releasable connector engageable between said base and said first end of said first arm, said fourth releasable connector including a pin engageable with any among a plurality of holes disposed in said base, whereby said body is movable among said plurality of angular positions relative to said base by moving said pin among said plurality of holes disposed in said base.

14. The apparatus of claim 13 wherein said first releasable connector is a hitch pin and said fourth releasable connector is a cotterless hitch pin.

15. The apparatus of claim 13 wherein the supporting structure including an outer surface, further comprising at least a fifth releasable connector engageable between said base and the supporting structure, said fifth releasable connector including at least one bolt extending through said base and the outer surface of the supporting structure.

16. The apparatus of claim 15 wherein the supporting structure is an electric golf cart.

17. The apparatus of claim 10 wherein the umbrella include a handle, a canopy and a shaft extending between the handle and the canopy, further wherein said carrier includes a cavity having an upper opening and being capable of enclosing the umbrella handle and a section of the umbrella shaft adjacent to the handle, wherein said first releasable connector is engageable with the shaft of the umbrella, whereby when the umbrella handle is moved through said cavity toward said upper opening of said cavity, said first releasable connector prevents removal of the umbrella handle from said cavity, preventing the umbrella from being disengaged from the apparatus.

18. The apparatus of claim 17 wherein said carrier includes first and second openings on opposing sides of said cavity, said cavity having a width, and wherein said first releasable connector is extendable into said first and second openings and across said width of said cavity, whereby when the umbrella handle is moved through said cavity toward said upper opening of said cavity, the umbrella handle abuts said first releasable connector within said cavity.

19. An apparatus connectable to a golf cart and capable of holding an umbrella at any among a plurality of different angles relative to the golf cart, the umbrella having first and second ends with a shaft therebetween and a handle disposed proximate to the first end, the apparatus comprising:
   a base associated with the golf cart,
   a body having first and second arms, said first arm of said body being movably engageable with said base and movable between at least two angular positions relative to said base, at least one said angular position disposing said first arm at least substantially adjacent to the golf cart, said second arm of said body being capable of releasably holding the first end of the umbrella,
   a first releasable connector associated with said second arm and releasably engageable with the umbrella, wherein said first releasable connector is capable of at least partially surrounding and contacting an outer surface of the shaft and preventing removal of the umbrella from said second arm by securing the handle within said second arm without penetrating an outer surface of the umbrella, whereby the handle cannot be removed from the second arm due to a pulling force on the umbrella in the axial direction of the second end of the umbrella, and
   said first and second arms being releasably connectable in any among a plurality of relative positions, whereby the distance between an umbrella held by said second arm and said base may be varied.

20. The apparatus of claim 19 further including a second releasable connector engageable between said base and said first end of said first arm, said second releasable connector including a pin engageable with any among a plurality of slots disposed in said base, whereby said first arm is movable among said at least two angular positions relative to said base by moving said pin among said plurality of slots in said base.

21. The apparatus of claim 20 wherein said first arm is releasably engageable with said base, further including a third releasable connector engageable between said first arm and said base, wherein said body may be disconnected from said base by disengaging said third releasable connector from at least one of said first arm and said base.

22. The apparatus of claim 21 wherein said first and second arms of said body are telescopically engageable, further including a fourth releasable connector engageable between said first and second arms, whereby said first and second arms may be disconnected by disengaging said fourth releasable connector from at least one of said first and second arms.

23. The apparatus of claim 22 wherein the golf cart includes an outer surface, further comprising a fifth releasable connector engageable between said base and the golf cart, said fifth releasable connector including at least one bolt extending through said base and the outer surface of the golf cart.

24. The apparatus of claim 20 wherein the umbrella include a handle, a canopy and a shaft extending between the handle and the canopy, further wherein said second arm includes a cavity having a width and an upper opening and being capable of enclosing the umbrella handle and a section of the umbrella shaft adjacent to the umbrella handle, said first releasable connector being disposable across the width of said cavity and engageable with the umbrella shaft, whereby when the umbrella handle is moved in said cavity in the direction of said upper opening, the umbrella handle abuts said first releasable connector within said cavity, preventing the umbrella handle from being removed from said cavity.

25. The apparatus of claim 24 wherein the golf cart is a golf bag pull-cart.

26. An apparatus useful with an umbrella holder for preventing an umbrella being carried thereby from being removed therefrom, the umbrella having a handle, a canopy and a shaft extending between the handle and the canopy, the apparatus comprising:
   an umbrella carrier having a cavity,
   said cavity having a width and an upper opening, said cavity being capable of generally enclosing the umbrella handle and a section of the umbrella shaft adjacent to the umbrella handle, and
   a releasable connector associated with said carrier and disposable across the width of said cavity, said releasable connector being capable of at least partially surrounding and contacting an outer surface of the shaft of the umbrella, whereby when the umbrella is moved out of said cavity through said upper opening, said releasable connector engages the umbrella handle within said cavity, preventing the umbrella from being removed from the umbrella holder.

27. The apparatus of claim 26 wherein said umbrella carrier has first and second openings on opposing sides of said cavity, wherein said releasable connector is removably extendable into said first and second openings and across the width of said cavity.

28. The apparatus of claim 27 wherein said releasable connector is a hitch pin.

29. The apparatus of claim 28 wherein the umbrella handle has a width and said releasable connector has first and second fingers disposed on opposing sides of the umbrella shaft when said releasable connector at least partially surrounds the umbrella shaft, wherein the distance between said first and second fingers of said releasable connector is smaller than the width of the umbrella handle.

30. An apparatus connectable to a supporting structure and capable of holding an umbrella at any among a plurality of differing angular positions relative to the supporting structure, the umbrella having first and second ends and a shaft extending at least partially therebetween, the apparatus comprising:
   a base,
   means for rigidly connecting said base with the supporting structure,
   a body having first and second arms,
   means for pivotably connecting said first arm with said base, whereby said body is movable between a plurality of different angular positions relative to the supporting structure,
   said second arm having a carrier, said carrier being capable of releasably carrying the first end of the umbrella,
   means for locking the umbrella to said carrier, said means for locking capable of at least partially surrounding and contacting an outer surface of the shaft of the umbrella, and
   means for adjustably connecting said first and second arms in any among a plurality of different axial positions relative to one another.

31. A method for holding an elongated member at any among a plurality of positions relative to a supporting structure with the use of an apparatus having a base and first and second arms, the second arm having a carrier capable of holding a first end of the elongated member, a first releasable connector engageable between the carrier and the elongated member and capable of preventing removal of the elongated member from the carrier, the first arm pivotably engageable with the base, a second releasable connector engageable between the first arm and the base in any among a plurality of positions, each such position disposing the first arm at a different angle relative to the base, the base being engageable with the supporting structure, the method comprising:

pivotably moving the first arm relative to the base into any among a plurality of angular positions relative to the base, securing the angular position of the body relative to the base by engaging the second releasable connector between the first arm and the base, disposing the first end of the elongated member into the carrier of the second arm, engaging the first releasable connector between the carrier and the elongated member, the first releasable connector at least partially surrounding and contacting an outer surface of the elongated member proximate to the first end of the elongated member, preventing removal of the elongated member from the carrier at least under typical operating conditions, moving the second arm relative to the first arm of the body to the desired height of the elongated member relative to the base, and securing the position of the second arm relative to the first arm by engaging the third releasable connector between the first and second arms.

32. The method of claim 31 further comprising positioning the base relative to the supporting structure and rigidly connecting the base to the supporting structure.

* * * * *